United States Patent

Iberall

[15] 3,704,708
[45] Dec. 5, 1972

[54] BLOOD PRESSURE MEASURING MECHANISM

[72] Inventor: Arthur S. Iberall, Radnor, Pa.

[73] Assignee: General Technical Services, Inc.

[22] Filed: May 4, 1970

[21] Appl. No.: 34,341

Related U.S. Application Data

[63] Continuation-in-part of Ser. No. 658,487, Aug. 4, 1967, abandoned.

[52] U.S. Cl. ............................................128/205 E
[51] Int. Cl. ..............................................A61b 5/02
[58] Field of Search..128/205 D, 205 E, 205 AG, 205 MN, 128/205 P, 205 Q, 205 R, 205 T, 205 V

[56] References Cited

UNITED STATES PATENTS

| | | | |
|---|---|---|---|
| 3,230,950 | 1/1966 | Buffington | 128/2.05 R |
| 3,102,534 | 9/1963 | Bigliano et al. | 128/2.05 N |
| 3,400,709 | 9/1968 | Funfstuck | 128/2.05 D |
| 3,535,067 | 10/1970 | Lesher et al. | 128/2.05 P |
| 3,456,648 | 7/1969 | Lee et al. | 128/2.05 O |
| 618,049 | 1/1899 | Barnard et al. | 128/2.05 N |
| 3,040,737 | 6/1962 | Kompelien et al. | 128/2.05 E |

FOREIGN PATENTS OR APPLICATIONS

| | | | |
|---|---|---|---|
| 846,886 | 8/1952 | Germany | 128/2.05 N |

*Primary Examiner*—William E. Kamm
*Attorney*—Molinare, Allegretti, Newitt & Witcoff

[57] ABSTRACT

An apparatus for observing and measuring the complete range of arterial blood pressures. A small casing is provided having a cavity. The cavity is sealed at one end by a flexible membrane and at the other by a pressure responsive transducer. The casing has a ridge portion for positioning over an arterial duct complimentary to the duct. As pressure changes in the duct, the voltage output of the transducer varies representative of the duct pressure.

2 Claims, 9 Drawing Figures

PATENTED DEC 5 1972

INVENTOR.
ARTHUR S. IBERALL

BY Molinare, Allegretti,
Newitt & Witcoff
ATTORNEYS

PATENTED DEC 5 1972

INVENTOR.
ARTHUR S. IBERALL
BY Molinare, Allegretti,
Newitt & Witcoff

ATTORNEYS

BLOOD PRESSURE MEASURING MECHANISM

CROSS REFERENCE TO RELATED APPLICATION

This is a continuation-in-part of my copending parent application entitled BLOOD PRESSURE MEASURING MECHANISM, by Arthur S. Iberall, Ser. No. 658,487, filed Aug. 4, 1967. The parent application was abandoned on May 6, 1970.

BACKGROUND OF THE INVENTION

This invention relates to blood pressure measuring devices and, more particularly, to a simple, easily operable device for measuring the entire range of pressures in a vascular system.

The measurement of the pressure that blood exerts on the walls of the arteries provides one means for physicians to determine whether a patient is healthy. The blood pressure varies with each heart beat, and, in fact, varies between a high and low level, more commonly known as the systolic and diastolic pressures. These pressures are obtained by using a stethoscope and a sphygmomanometer.

The sphygmomanometer measures the blood pressure by comparing the pressure in the main artery of the arm with the pressure in an inflatable cuff wrapped around the arm. The inflated cuff stops the flow of blood through the artery. A valve allows the air pressure in the cuff to be reduced to the point where blood again may flow through the artery. When blood does begin to flow again through the artery the physician will hear through his stethoscope a loud booming noise which is coincident with the pulse beats of the heart. Upon first hearing these pulse beats, the physician will be aware that blood is spurting through the artery and that the pressure in the cuff, as indicated in a mercury-filled pressure gauge, is just below the high blood pressure of the patient.

As the physician continues to lower the cuff pressure he will no longer hear a noise in the stethoscope. Blood will then be flowing freely through the artery and the pressure at which this happens is likewise noted on the mercury pressure gauge and recorded as the low blood pressure of the patient. An average blood pressure is 120/70 which means 120 millimeters of mercury pressure, is the maximum blood pressure and 70 millimeters of mercury is the minimum blood pressure. This corresponds to 2.3 and 1.3 pounds of pressure per square inch respectively.

The sphygmomanometer is utilized basically to measure only the maximum and minimum blood pressures in an artery. Also, it must be used in combination with a stethoscope. More useful information could be obtained if there were some easy means to observe the behavior of the blood pressure between the maximum and the minimum. Such data would be analogous to the electric impulse data garnered by an electrocardiogram. In addition to providing information about the heart beat itself, such a device would give some indication of the state of health of the arterial vascular system.

A known prior art device, for example the device shown in French Pat. No. 1,285,774 employ a transducer in a casing for monitoring blood pressure in a vascular duct. However, the device is not adapted to fit over and compliment the vascular duct so as to avoid cutting off of fluid flow through the duct. Also the device provides no circuitry for reading out and separating AC and DC components of voltage from the transducer.

Accordingly it is desirable to provide an improved blood pressure measuring mechanism adapted to fit over and compliment the vascular duct. It is also desirable to provide such a device capable of making a highly accurate measurement of blood pressure. It is further desirable to provide such a device for monitoring which includes switching circuitry for selectively conducting (1) a product voltage representative of the pressure of the device against the skin and pressure of fluid in the duct to be measured, or (2) a filtered voltage representative of only the pressure of fluid in the duct.

SUMMARY OF THE INVENTION

In a principal aspect, the present invention comprises a blood pressure measuring device which features, a housing having a lower ridge portion, a cavity defined in the housing, a flexible membrane sealing the cavity at one end, and a transducer secured in the housing adjacent the membrane. The lower ridge portion defines a rectangular channel having two shoulders, one on each side of the channel. The membrane is fitted against the skin of a patient, the rectangular channel fitting over and complimenting the vascular duct for which a pressure curve is desired. The shoulders engage covering around the duct pressing it inwardly from the shoulders toward the membrane.

It is thus an object of this invention to provide an improved device for continually and accurately measuring the changing pressure of fluids in a vascular system.

It is a further object of the present invention to provide a simply constructed, economical device for measuring vascular system pressures.

Still another object of the present invention is to provide a device which permits visual and recordable measurements of the pressure in a vascular system.

These and other objects, features and advantages of the present invention will be more fully set forth in the detailed description which follows.

BRIEF DESCRIPTION OF THE DRAWINGS

There is shown in the attached drawing a presently preferred embodiment of the present invention wherein like numerals refer to like elements and wherein.

DESCRIPTION OF THE PREFERRED EMBODIMENT

Figure 1:
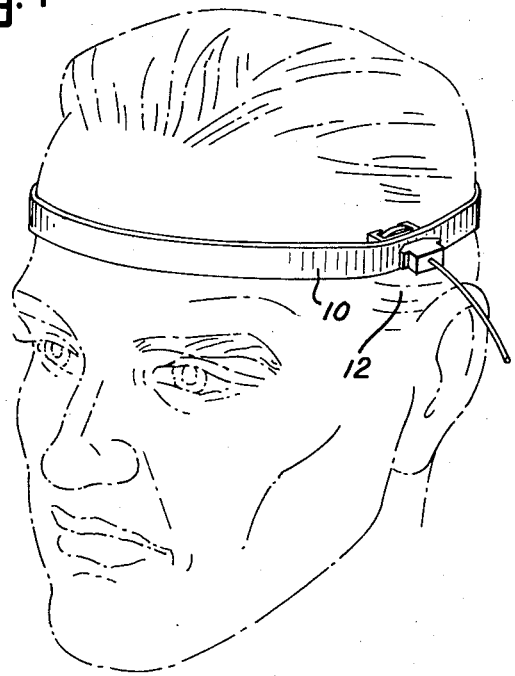
FIG. 1 is a perspective view illustrating the improved blood pressure measuring device positioned over the temporal artery.

As shown in FIG. 1, a strap 10 serves to position the improved blood pressure measuring device generally shown at 12 against an artery in the temple of the patient.

Figure 2:
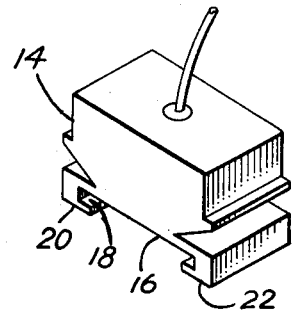
FIG. 2 is an enlarged perspective view of the improved blood pressure measuring device.

FIG. 2 is an enlarged view of the device 12 illustrated in FIG. 1. The device 12 is comprised of a base block or housing 14 which has a ridge portion 16 defined in the housing 14. The ridge portion 16 includes a rectangular channel 18 and shoulders 20 and 22 adapted to fit over a vascular duct.

Figure 3A:
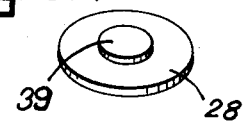
FIG. 3A is an enlarged perspective view of a flexible membrane adapted for use with the device of FIG. 2.
Figure 3:
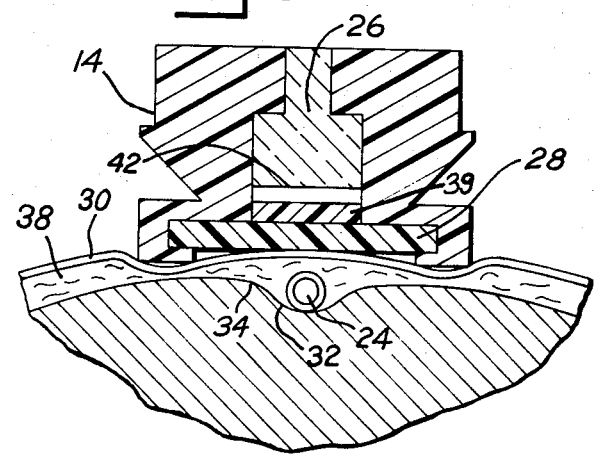
FIG. 3 is a cross-sectional view of the improved blood pressure measuring device positioned against the skin of a patient over an artery.

FIG. 3 shows a cross-sectional view of the device in operative position over a vascular duct 24. The housing of substantially rectangular shape has a cavity 26 which is sealed from the atmosphere at one end by a flexible membrane or diaphragm 28. The bottom portion of the housing 14 is shaped to define the rectangular channel 18 which fits in complimentary fashion over the vascular duct 24 along a short distance of the duct. Thus, as illustrated in FIG. 3, the housing 14 has a substantially rectangular shape. The membrane 28 is positioned between shoulders 20 and 22 and fits against the upper surface of the rectangular channel 18. When the device is pressed against the skin 30 of the patient, the shoulders 20 and 22 engage the skin 30 aligning with the duct 24. In this position, the duct 24, situated in the tissue area 38, is trapped between the shoulders 20 and 22 and pressed inwardly from the shoulders 20 and 22.

When the device 12 is positioned over the vascular duct 24, the duct 24 is entrapped in the rectangular channel 18 between the shoulders 20 and 22 and beneath the flexible membrane 28. The blood pressure measuring device 12 should be placed over a portion of the duct 24 lying in a groove defined in the skeletal structure of the animal for optimal response. For example, the bony groove 32 having upper curved regions 34 and 36 will serve to cooperate with the rectangular channel 18 for entrapping the duct 24 beneath the membrane 28.

In practice the block 14 is constructed of a transparent moldable material such as acrylic and has overall dimensions of approximately 1 centimeter in length and 1 centimeter in width by one-half centimeter in depth.

The membrane 28, shown more clearly in FIG. 3A, is a disk shaped diaphragm of sponge material commonly identified under the trademark SILASTIC. It has been found that a disk one-sixteenth inch thick and one-half inch in diameter will function acceptably.

A neck or raised portion 39 in the form of an annular disk is integrally molded to the membrane 28. The neck 39 is adapted to fit snugly into the cavity 26 for sealing the cavity 26 and more accurately sensing the pressure of the duct 24. As flow of blood through the duct 24 enlarges or constricts the duct 24, the membrane 28 is caused to move responsively.

PREFERRED EMBODIMENT OF THE TRANSDUCER

A fluid activated transducer 42 is secured in the cavity 26 positioned to reflect changes of pressure at the neck 39 of the diaphragm 28. The transducer 42 is one of the type commonly known in the art.

Figure 5:
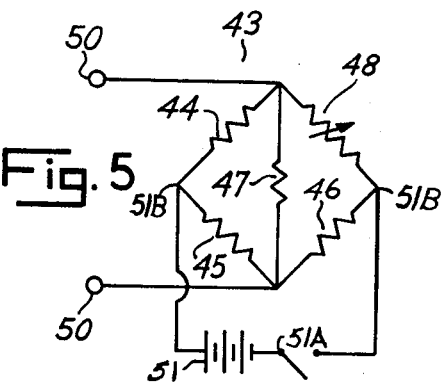
FIG. 5 is a circuit diagram of a preferred embodiment of the transducer employed by the device of FIG. 1.
Figure 4:
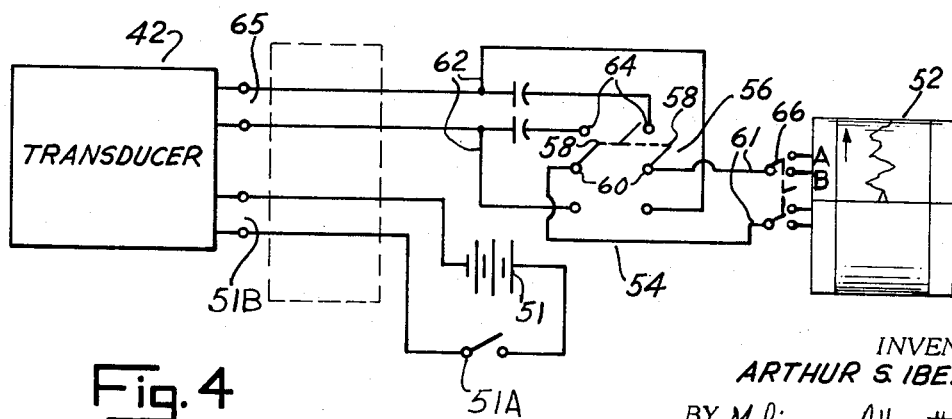
FIG. 4 is a circuit diagram of the switching circuitry and recorder for continuously displaying the pressure sensed by the device of FIG. 1.

Referring to FIGS. 4 & 5, the transducer 42 may take the form of a Wheatstone Bridge 43 having fixed resistors 44, 45, 46 and 47 and variable resistor 48. The variable resistor may be positioned on the neck 39 of the membrane 28 so that movement of the neck 39 causes physical distortion of the variable resistor 48. The distortion varies the resistance of resistor 48 and serves to produce a voltage across the output terminals 50 of the bridge 43 representative of the distortion.

Means for monitoring this voltage representative of pressure may take the form of an oscilloscope or a recorder. A recorder is preferable as it will give continuous readings and record these readings for future reference.

Power is supplied to the transducer 42 from a DC voltage source 51. The power from the voltage source 51 may be controlled by a single pole, single throw manually operable switch 51A in series with the voltage source 5. As shown in FIG. 4, the switch 51A is in the "off" position. Voltage source 51 and switch 51A are in series across the input terminals 51B of the transducer 42, which are also the input terminals of the Wheatstone Bridge 43.

OPERATIVE PRINCIPLES OF THIS SYSTEM

The principle operation of this system does not depend upon the elastic properties of the vascular system, but only upon the equal transmission of a hydrostatic pressure in all directions, if the pressure producing source is suitably confined. Thus when a plate is pressed down on a pressurized duct possessing either small or large elastic resilience so as to flatten the duct at least in part, then the force required to flatten that area divided by the area is a measure of the internal pressure in the duct.

This differs from cuff techniques which attempt to put an entire volume into hydrostatic pressure, and thereby to measure one or more identifiable events when an internal duct is constructed by external hydrostatic forces.

In the present case, an attempt is made to flatten an internal duct. However, there is interposed tissue, in which both the duct and tissue are elastic. A solid backing is the preferred internal arrangement by which such flattening can be achieved. This can be realized in a number of regions in the body, where an artery passes over a bony prominence. The temporal artery in the temple is a prime example. Against such a backing, an approximately triangular region can be confined in which the confinement pressure is sufficient to flatten the duct into a desirable configuration, namely nearly triangular. Under these circumstances, the elasticity of duct, tissue, membrane, and springiness of the manometric system or fluid, provides a linear measure of pressure in the duct. The calibration constants $a$ and $b$ in $$p = a + b \Delta p$$

$p$=duct pressure  $\Delta p$=manometric pressure depend on the tissue characteristics, duct characteristics, and the degree to which the confining force is applied. The confining block is designed to provide automatic stops against the underlying bone, so that confining force is not a critical parameter. Thus calibration can be achieved for a subject by checking against a sphygmomanometer.

In practice the device of the present invention must be used on a vascular duct which is near the surface of the body, for example, the temporal artery.

POSITIONING OF THE MEASURING DEVICE

Positioning of the device 12 over the vascular duct 24 is important for the accuracy of this device. The strap 10 should be placed on the head of the wearer and the measuring device 12 brought into approximate contact over the temporal artery.

When the device 12 is in this position, the transducer 42 will produce a voltage product having both AC and DC components. The AC voltage component is representative of the fluctuating blood pressure of the duct 24, and the DC voltage component is representative of the constant off-set pressure of the device 12 against the head of the wearer. Generally, the DC component of voltage will exceed the AC component of voltage by a multiple of ten or more. For example, an acceptable DC component of voltage would be in the range of 10–18 millivolts.

A voltage below this range indicates that the device is not sufficiently mechanically coupled to the duct 24 to provide accurate readings of the blood pressure of the duct 24. A DC component of voltage in excess of this range (for example a voltage in excess of 20 millivolts) indicates that the pressure of the device 12 against the head of the wearer is excessive. This excess pressure could produce a cutting off of the flow of blood through the duct 24 and cause a termination of the accurate response of the monitoring device. Also, excessive pressure might damage the elements of the transducer 42.

A monitoring circuit 54 has been provided for separating and reading out the AC and DC components of voltage produced by the transducer 42. This monitoring circuit 54 includes a double pole, double throw switch 56, having movable contacts 58 and fixed contacts 60. The fixed contacts 60 are connected to the input 61 of the recorder 52. The movable contacts 58 are movable into contact with shunt contacts 62 and alternately with capacitive filtering contacts 64.

With the switch 56 connected to shunting contacts 62, the AC and DC components of voltage from the output 65 of the transducer 42 are conducted to the recorder 52. When the switch 56 is placed in contact with the capacitive filtering leads 64, the capacitors 66 act as a filter with respect to the DC component of voltage from transducer 42 and as a closed circuit or conductive path with respect to the AC component voltage from transducer 42.

As has been described, the DC component of voltage exceeds the AC component by a multiple of 10 or more. Accordingly, in the shunt mode, the output to the recorder 52 is approximately equal to the DC component of voltage. A range switch 66 is provided on the recorder 52 for switching the recorder range by a factor of 10. Accordingly, with the range switch in position A, the recorder is provided with a 0 to 3 millivolt range, and with the range switch in position B, recorder 52 is provided with a scale reading from 0–30 millivolts.

While the device is being positioned over the duct 24, the switch 56 should be in the DC mode in contact with shunting leads 62 and the range switch 66 of the recorder 52 should be in position B so as to have a full scale reading of 30 millivolts. In the present embodiment, it has been found that an acceptable off-set value of DC voltage is between 10 and 18 millivolts with an outside maximum of 20 millivolts. The strap 10 should be adjusted over the duct 24 in such a fashion as to provide a reading in this range.

After this initial adjustment has been made, the switch 56 should be placed into the AC mode with movable contact members 58 in contact with capacitive filtering leads 64. The range switch 66 of the recorder 52 should be moved into position A providing the recorder 52 with a full scale reading of 3 millivolts. Having thus adjusted the monitoring circuitry 54, the device 12 should be adjusted until the maximum signal amplitude is read out on the recorder 52. Next the off-set pressure should be decreased or increased until the signal amplitude is at a maximum.

The device of the present invention has been used successfully on the human arterial vascular system; however, the principle is not limited to this system. Such a device may be used to measure pressure in any vascular or fluid bearing system which transports material in elastically deformable tubes.

ALTERNATIVE EMBODIMENT

Figure 6:
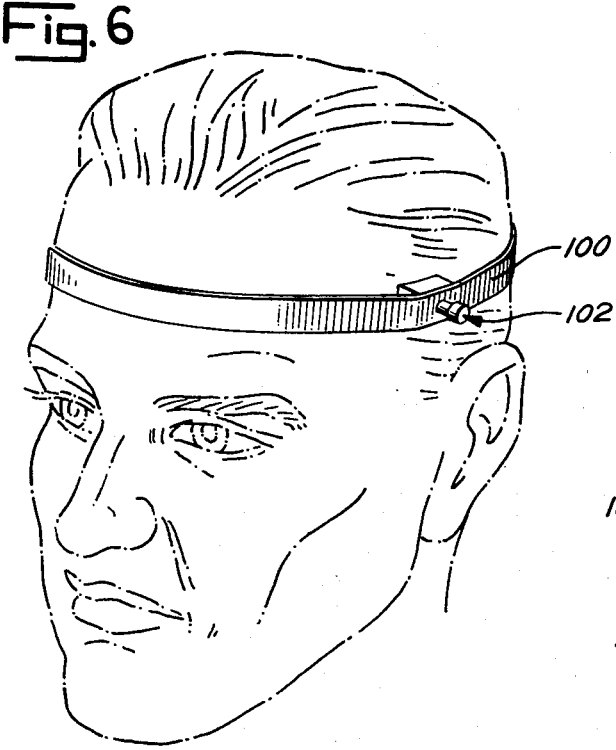
FIG. 6 is a perspective view illustrating an alternative embodiment of the blood pressure measuring device positioned over the temporal artery.

In FIG. 6 a strap 100 serves to position the blood pressure measuring device generally shown at 102 against an artery in the temple of the patient.

Figure 7:
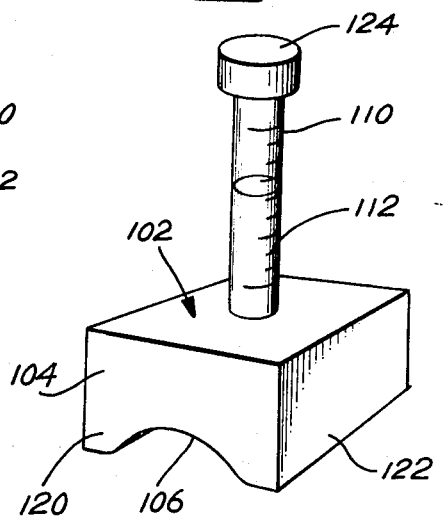
FIG. 7 is an enlarged perspective view of the blood pressure measuring device of FIG. 6 with the capillary being capped.

FIG. 7 is an enlarged view of the alternative device 102. The device 102 is comprised of a base block 104 which has a curved lower portion 106 adapted to fit over a vascular duct and to bear against a bony backing structure 108. Extending through the top of the block 104 is a capillary tube 110 which is transparent to permit visual observation. Indicia 112 are scribed at uniform linear intervals along the capillary tube. The indicia 112 are optional and may not be advantageous when the blood pressure device is used in combination with a photocell measurement apparatus. A removable cap 124 is positioned on the top of the open ended capillary 110.

Figure 8:
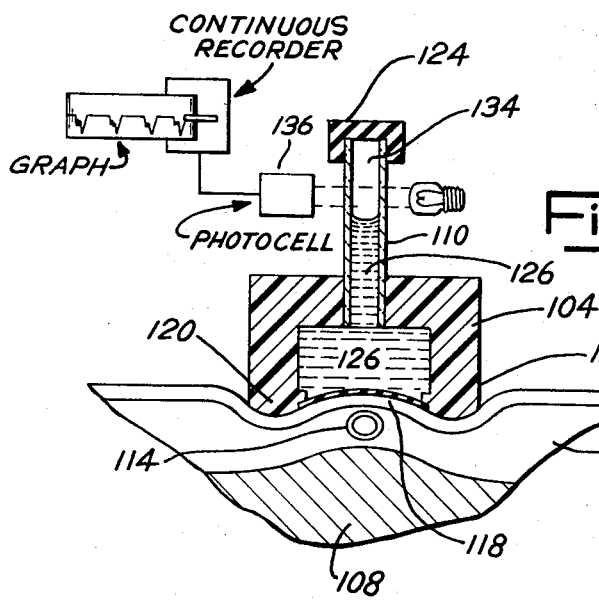
FIG. 8 is a cross-sectional view of the blood pressure measuring device of FIG. 6 positioned against the skin of a patient over an artery.

FIG. 8 shows a cross-sectional view of the device in operative position over a vascular duct 114. The block 104 has a fluid filled inner cavity 116 which is sealed from the atmosphere by a flexible membrane or diaphragm 118. The block 104 has a substantially rectangular shape. The bottom portion of the block 104 is shaped to define a curved surface which will cover the vascular duct 114 along a short distance of the duct. Thus, as illustrated in FIG. 8, the curved surface is defined by the membrane 118 and the lower side portions 120 and 122 of the block 104. The end portions of the block 104 are curved to fit over the duct 114 as is illustrated by the lower curved end portion 106 in FIG. 7.

The capillary 110 extends through the block 104 from the cavity 116 and is temporarily sealed by the removable cap 124. Fluid 126 is situated inside the cavity 116 and fills a portion of the interior of the capillary 110. The device is pressed against the skin 128 of the patient and tends to pinch up the skin and trap the duct 114, which is situated in the tissue area 130, against the bone 108.

The principal of operation does not depend upon the elastic properties of the vascular system, but only upon the equal transmission of a hydrostatic pressure in all directions, if the pressure producing source is suitably confined. Thus when a plate is pressed down on a pressurized duct possessing either small or large elastic resilience so as to flatten the duct at least in part, then the force required to flatten that area divided by the area is a measure of the internal pressure in the duct.

In practice the device of the present invention must be used on a vascular duct which is near the surface of the body, for example, the temporal artery. Cap 124 is removed from the capillary 110 during the procedure to locate the artery, since maximum deflections of the liquid level in the capillary 110 occur when the cap 124 is removed. Under this condition, the manometer is really being used as a displacement gauge of the elastic effect of pressure in the elastic duct which is elastically deforming the overlying tissue. In some crude way this deflection is also proportional to pressure, but it depends on assuming elastic characteristics of all the tissue, and it depends critically on positioning. This differs from confinement, with the manometer closed so that a stiff manometric spring is presented to the tissue, sufficient to deform the arterial duct into triangular shape, but so shaped that the duct cannot be pinched off. Thus the artery is preferably confined between the device 102 and a bony prominence such as illustrated by the bone 108 in FIG. 8.

After the artery is located, the cap 124 is placed on the capillary 110 leaving a short air spring column 134 in the capillary. The fluid-gas filled capillary now acts as a stiff spring relative to the arterial segment with is covered by the device 102. Since the artery is confined between the bone 108 and the device 102, the level of the liquid spring is affected by the arterial expansion which distorts the membrane 118. Because the duct 114 and tissue 130 are confined, and the membrane 118, manometric fluid 126, and confined air spring column 134 are elastic, the displacement of the membrane 118 is directly and linearly proportional to the pressure within the artery.

Experiments have been performed testing the device wherein the variation in the height of fluid in the capillary column was detected by an AC differential photocell apparatus 136. A continuous record of the pressure was obtained with a resolution sufficient to show the incisura in the pressure pulse.

While in the foregoing there has been set forth a preferred embodiment of the present invention, it is to be understood that all those embodiments obvious to persons skilled in the art and all those embodiments which are equivalent are to be included within the scope of the claimed invention.

What is claimed is:

1. A device for continuously monitoring internal pressure in a vascular system of a skeletal animal at a remote location comprising, in combination:

a housing having a lower ridge portion including a first shoulder on one side thereof and a second shoulder on the other side thereof, said shoulders defining a laterally extending, rectangular, open-ended channel therebetween, said ridge portion adapted to fit over and complement a vascular duct, said shoulders adapted to engage covering around the vascular duct and hold substantially at the sides of the vascular duct pressing the duct inwardly from the shoulders, a flexible membrane secured to said housing at said rectangular channel and adapted to fit over said duct, a transducer secured in said housing adjacent and coupled to said membrane for generating a voltage in response to pressure against said membrane, means for passing only the AC component of voltage from said transducer connected to the output of said transducer, means for displaying a voltage, and switching means connected to said display means for selectively conducting the output voltage from said transducer where only the AC component of said voltage to said monitoring means such that the voltage of said transducer representative of the pressure of said device against said animal and the pressure of said duct may be displayed on said display means, and alternatively, the AC component of said voltage, representative only of the pressure of said duct may be displayed on said display means.

2. The device of claim 1 wherein said flexible membrane is a sponge SILASTIC disc.

* * * * *